United States Patent [19]  
Rosthal

[11] Patent Number: 5,329,448  
[45] Date of Patent: Jul. 12, 1994

[54] METHOD AND APPARATUS FOR DETERMINING HORIZONTAL CONDUCTIVITY AND VERTICAL CONDUCTIVITY OF EARTH FORMATIONS

[75] Inventor: Richard A. Rosthal, Houston, Tex.

[73] Assignee: Schlumberger Technology Corporation, Houston, Tex.

[21] Appl. No.: 741,858

[22] Filed: Aug. 7, 1991

[51] Int. Cl.$^5$ .............................................. G01V 1/40
[52] U.S. Cl. .................................. 364/422; 324/339
[58] Field of Search ............... 364/420, 422; 324/338, 324/339, 340, 343

[56] References Cited

U.S. PATENT DOCUMENTS

| | | | |
|---|---|---|---|
| 4,794,572 | 9/1986 | Sondergeld et al. | 367/31 |
| 4,832,148 | 5/1989 | Becker et al. | 181/104 |
| 5,045,795 | 9/1991 | Gianzero et al. | 324/342 |
| 5,115,198 | 5/1992 | Gianzero et al. | 324/339 |

OTHER PUBLICATIONS

Chemali et al., "The Effect of Shale Anisotropy on Focused Resistivity Devices," SPWLA 28th Annual Logging Symposium, 1987.
Moran et al., "Basic Theory of Induction Logging and Application To Study of Two Coil Sondes," Geophysics, vol. 27, No. 6, 1962.
Klein, James D., "Induction Log Anisotropy Corrections", SPWLA 32nd Annual Logging Symposium, Jun. 16-19, 1991.
Fylling, Arne, "Estimated Conductivity and Saturations in the Sands of Thinly Laminated, Dipping Sand/Shale Sequences", SPWLA 32nd Annual Logging Symposium, Jun. 16-19, 1991.
Leake et al., "Logging While Drilling Keeps Horizontal Well on Small Target", Oil and Gas Journal, Sep. 23, 1991.

Primary Examiner—Roy N. Envall, Jr.
Assistant Examiner—A. Bodendorf
Attorney, Agent, or Firm—Martin Novack; John J. Ryberg; Wayne I. Kanak

[57] ABSTRACT

The disclosed technique and apparatus utilizes the different characteristic responses of a plurality of signals from a propagation or induction well logging device to determine the vertical and horizontal resistivity of formations surrounding a borehole. In a disclosed embodiment, a method is set forth for determining the horizontal conductivity and the vertical conductivity of formations surrounding an earth borehole, including the following steps: a) deriving first and second formation conductivity values from measurements taken in the borehole; b) selecting a horizontal conductivity model value and a vertical conductivity model value; c) computing error values from the differences between: (i) first and second composite conductivity values computed as a function of the horizontal and vertical conductivity model values, and (ii) the first and second derived formation conductivity values; d) modifying the horizontal and vertical conductivity model values; e) repeating steps (c) and (d) until predetermined criteria of the error values are met; and f) outputting modified horizontal and vertical conductivity model values.

49 Claims, 9 Drawing Sheets

METHOD AND APPARATUS FOR DETERMINING HORIZONTAL CONDUCTIVITY AND VERTICAL CONDUCTIVITY OF EARTH FORMATIONS

FIELD OF THE INVENTION

This invention relates to the field of earth borehole logging and, more particularly, to a method and apparatus for determining horizontal conductivity and vertical conductivity of earth formations.

BACKGROUND OF THE INVENTION

It is recognized in the well logging art-that formations surrounding an earth borehole can be anisotropic with regard to conduction of electrical currents (see e.g. K. S. Kunz et al., Some Effects Of Formation Anisotropy On Resistivity Measurements In Boreholes, Geophysics, Vol. 23, No. 4, 1958). The phenomenon of electrical anisotropy is generally visualized in one of two ways, or a combination thereof, as follows.

In many sedimentary strata, electric current flows more easily in-a direction parallel to the bedding planes than transversely to them. A reason for this anisotropy is that a great number of mineral crystals possess a flat or elongated shape (e.g. mica and kaolin). At the time they were laid down, they naturally took an orientation parallel to the plane of sedimentation. The interstices in the formations are, therefore, generally parallel to the bedding plane, and the current is able to travel with facility along these interstices which often contain electrically conductive mineralized water. Such electrical anisotropy, sometimes called microscopic anisotropy, is observed mostly in shales.

If a cylindrical sample is cut from a formation, parallel to the bedding planes, the resistivity of this sample measured with a current flowing along its axis is called the longitudinal (or horizontal) resistivity $R_h$. The inverse of $R_h$ is the horizontal conductivity, $\sigma_h$. If a similar cylinder is cut perpendicular to horizontal) resistivity $R_h$. The inverse of $R_h$ is the horizontal the bedding planes, the resistivity measured with a current flowing along its axis is called the transversal (or vertical) resistivity $R_v$. The inverse of $R_v$ is the vertical conductivity, $\sigma_v$. The anisotropy coefficient $\lambda$, by definition, is equal to $$\sqrt{R_v/R_h} \text{ (or } \sqrt{\sigma_h/\sigma_v}\text{).}$$

Laboratory measurements have shown that $\lambda$ may range from 1 to about 2.5 in different shales.

Furthermore, the formations are often made up of a series of relatively thin beds having different lithologic characteristics and, therefore, different resistivities (as, for example, sequences of thin shales and hard streaks). In well logging systems the distances between the electrodes or antennas are great enough that the volume involved in a measurement may include several such thin beds. Since, in this situation, the current flows more easily along the more conductive streaks than transversely to the series of beds, there is effective anisotropy. The effects on resistivity measurements of this "macroscopic" anisotropy are cumulative with the effects of the anisotropy due to the above-described microscopic structure of the sediments. Reference can also be made to J. H. Moran et al., "Effects Of Formation Anisotropy On Resistivity Logging Measurements, Geophysics, Vol. 44, No. 7, 1979, and to R. Chemali et al., "The Effect Of Shale Anisotropy On Focused Resistivity Devices", SPWLA Twenty-Eighth Annual Logging Symposium, 1987.

The determination of $R_v$ as well as $R_h$ can be useful in various situations. For example, consider the case where the formation consists substantially of two types of material with resistivities $R_1$ and $R_2$ with respective volume fractions $\alpha$ and $1-\alpha$. The effective horizontal and vertical resistivities $R_h$ and $R_v$ are given by $$R_h = \frac{R_1 R_2}{(\alpha R_2) + ((1 - \alpha)R_1)} \quad (1)$$

$$R_v = (\alpha R_1) + ((1 - \alpha)R_2) \quad (2)$$

If $\alpha$ is known, such as in a shale sequence where a gamma ray measurement or a spontaneous potential measurement has been used to provide the shale fraction, $R_1$ and $R_2$ can be determined from (1) and (2) if $R_h$ and $R_v$ are known.

In situations where the borehole intersects the formations substantially perpendicular to the bedding planes, conventional induction and propagation well logging tools are sensitive almost exclusively to the horizontal components of the formation resistivity. When the borehole intersects the bedding planes at an angle, the tool readings contain an influence from the vertical resistivity as well as the horizontal. This is particularly true when the angle between borehole and the normal to the bedding planes becomes large, such as in directional or horizontal drilling where angles near 90° are commonly encountered. In these cases, the influence of vertical resistivity can cause discrepancies between measurements in these wells and measurements taken of the same formation in nearby vertical wells, thereby preventing useful comparison of these measurements. In addition, since reservoir evaluation is typically based upon data from vertical wells, use of data from wells drilled at high angles may produce erroneous estimates of formation producibility if proper account is not taken of the anisotropy effect.

A number of techniques have been proposed for measuring formation anisotropy and/or vertical conductivity, such as by providing transmitter and/or receiver coils that are perpendicular to the borehole axis in addition to coils having conventional orientations. Reference can be made, for example, to U.S. Pat. Nos. 4,302,722, 4,302,723, and 4,980,643.

Equipment and techniques that determine horizontal and vertical conductivity (or anisotropy) by employing special equipment dedicated specifically to such purpose result in increased equipment cost and increased logging time and/or cost. It is among the objects of the present invention to provide an apparatus and technique for determining horizontal and vertical conductivity (or anisotropy determinable therefrom) using measurements that are often available from conventional types of equipment utilized for logging earth boreholes during drilling or by wireline.

SUMMARY OF THE INVENTION

A form of the present invention utilizes the different characteristic responses of a plurality of signals from a propagation or induction well logging device to determine the vertical and horizontal resistivity of formations surrounding a borehole. In a disclosed embodiment of the invention, a method is set forth for determining the horizontal conductivity and the vertical conductivity of formations surrounding an earth borehole, comprising the steps of: a) deriving first and second formation conductivity values from measurements taken in the borehole; b) selecting a horizontal conductivity model value and a vertical conductivity model value; c) computing error values from the differences between: (i) first and second composite conductivity values computed as a function of said horizontal and vertical conductivity model values, and (ii) said first and second derived formation conductivity values; d) modifying said horizontal and vertical conductivity model values; e) repeating steps (c) and (d) until predetermined criteria of said error values are met; and f) outputting modified horizontal and vertical conductivity model values. [In the present application, any references to determination or use of resistivity are intended to generically mean conductivity as well, and vice versa. These quantities are reciprocals, and mention of one or the other herein is for convenience of description, and not intended in a limiting sense.] The derived first and second formation conductivity values are obtained from measurements which are affected differently by the vertical and horizontal conductivities of the formations. In an embodiment of the invention, the horizontal and vertical conductivity model values are modified as a function of the error values. In this embodiment, the error values comprise a first error value that depends on the difference between the first composite conductivity value and the first derived formation conductivity value, and the second error value depends on the difference between the second composite conductivity value and the second derived formation conductivity value.

In a further embodiment of the invention, there is disclosed a method for determining the horizontal conductivity and the vertical conductivity of earth formations surrounding a borehole, including the following steps: a) deriving first and second formation conductivity values from measurements taken in the borehole, the derived first and second conductivity values being obtained from measurements which are affected differently by the vertical and horizontal conductivities of the formations; b) deriving an angle related to the dip of said formations; c) computing horizontal and vertical conductivity values from the derived first and second conductivity values and the derived angle; and d) outputting the horizontal and vertical conductivity values. In a form of this embodiment, the step of computing horizontal and vertical conductivity values includes storing a look-up table of values, and selecting values from the look-up table based on the derived first and second conductivity values and the derived angle.

Further features and advantages of the invention will become more readily apparent from the following detailed description when taken in conjunction with the accompanying drawings.

DETAILED DESCRIPTION

Figure 1:
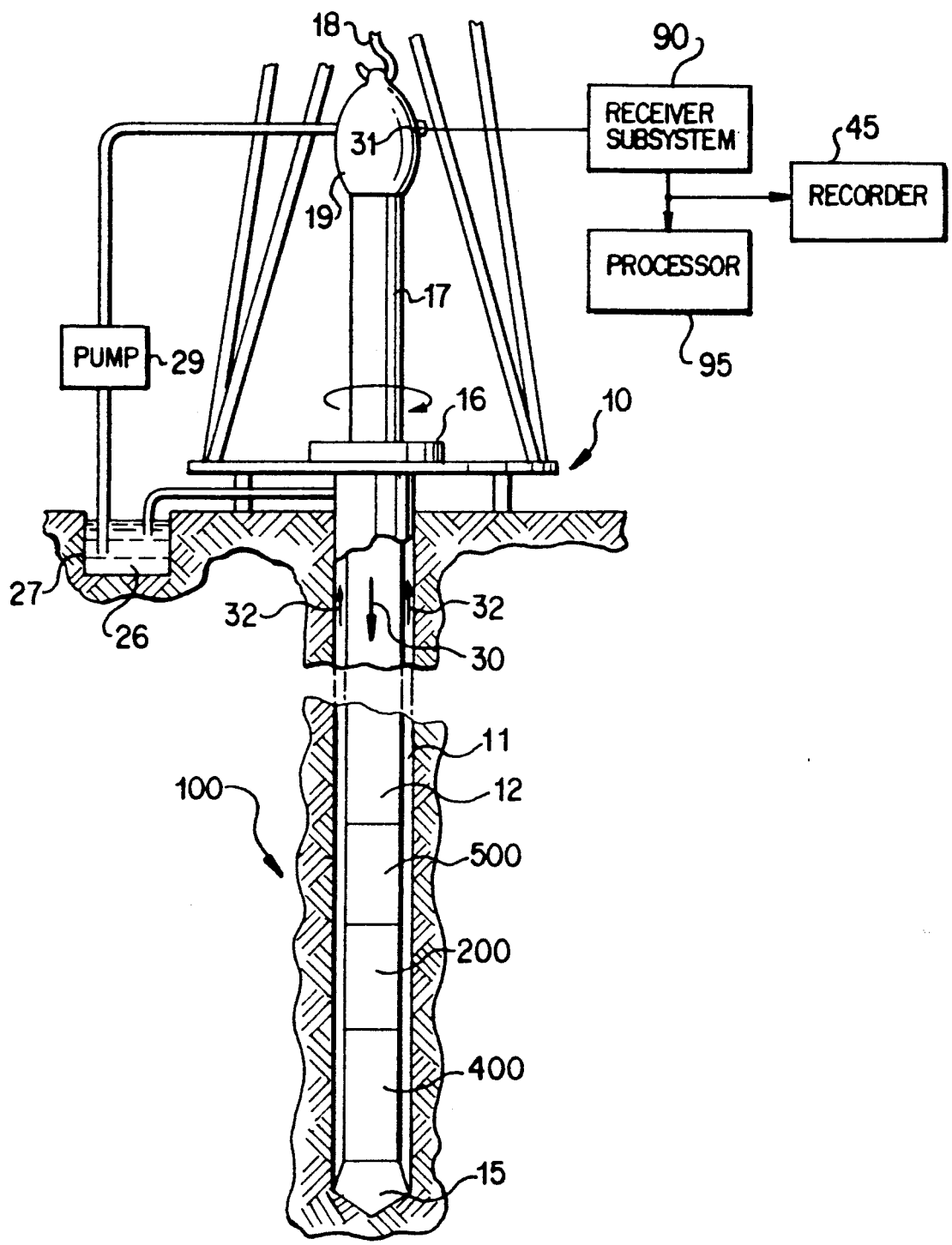
FIG. 1 is a diagram, partially in block form, of an apparatus that can be utilized in practicing an embodiment of the invention.

Referring to FIG. 1, there is illustrated an embodiment of the invention in conjunction with a logging-while-drilling apparatus. A platform and derrick 10 are positioned over a borehole 11 that is formed in the earth by rotary drilling. A drill string 12 is suspended within the borehole and includes a drill bit 15 at its lower end. The drill string 12 and the drill bit 15 attached thereto are rotated by a rotating table 16 (energized by means not shown) which engages a kelly 17 at the upper end of the drill string. The drill string is suspended from a hook 18 attached to a travelling block (not shown). The kelly is connected to the hook through a rotary swivel 19 which permits rotation of the drill string relative to the hook. Alternatively, the drill string 12 and drill bit 15 may be rotated from surface by a "top drive" type of drilling rig.

Drilling fluid or mud 26 is contained in a pit 27 in the earth. A pump 29 pumps the drilling fluid into the drill string via a port in the swivel 19 to flow downward through the center of drill string 12, as indicated by flow arrow 30. The drilling fluid exits the drill string via ports in the drill bit 15 and then circulates upward in the region between the outside of the drill string and the periphery of the borehole, as indicated by flow arrows 32. The drilling fluid thereby lubricates the bit and carries formation cuttings to the surface of the earth. The drilling fluid is returned to the pit 27 for recirculation.

Mounted in conjunction with the drill bit 15 is a bottom hole assembly 100 that may include an optional directional drilling assembly 400 with a mud motor having a bent housing or an offset sub (not separately represented). Mounted above optional subassembly 400 is a formation resistivity (or conductivity) measuring apparatus 200 which is described further hereinbelow. A measurement and communications subassembly 500 is also provided and includes means, known in the art, for measuring and/or computing the direction and inclination of the bottom hole assembly, the rotational orientation of the bottom hole assembly ("tool face"), and, typically, other measurements which need not be summarized herein. The communications portion of the subassembly 500 may typically be a mud pulse telemetry system that includes a downhole transmitter for sending coded information, including measurement signals, uphole and surface instrumentation for detecting and decoding the information. One type of mud pulse telemetry system has an acoustic transmitter which employs a device known as a "mud siren" which includes a slotted stator and a slotted rotor that rotates and repeatedly interrupts the flow of drilling fluid to establish a desired acoustic wave signal in the drilling fluid. Driving electronics in subassembly 500 may typically include a suitable modulator, such as a phase shift keying (PSK) modulator, which conventionally produces driving signals for application to the mud transmitter. These driving signals can be used to apply appropriate modulation to the mud siren. The generated acoustic mud wave travels upward in the fluid through the center of the drill string at the speed of sound in the fluid. The acoustic wave is received at the surface of the earth by transducers represented by reference numeral 31. The transducers, which are, for example, piezoelectric transducers, convert the received acoustic signals to electronic signals. The output of the transducers 31 is coupled to the uphole receiving subsystem 90 that is operative to demodulate the transmitted signals, which can then be coupled to a processor 85 and a recorder 45. The processor 85 can be of any suitable type, for example a digital microprocessor, with associated memory, timing, input/output, and display functions.

Figure 2:
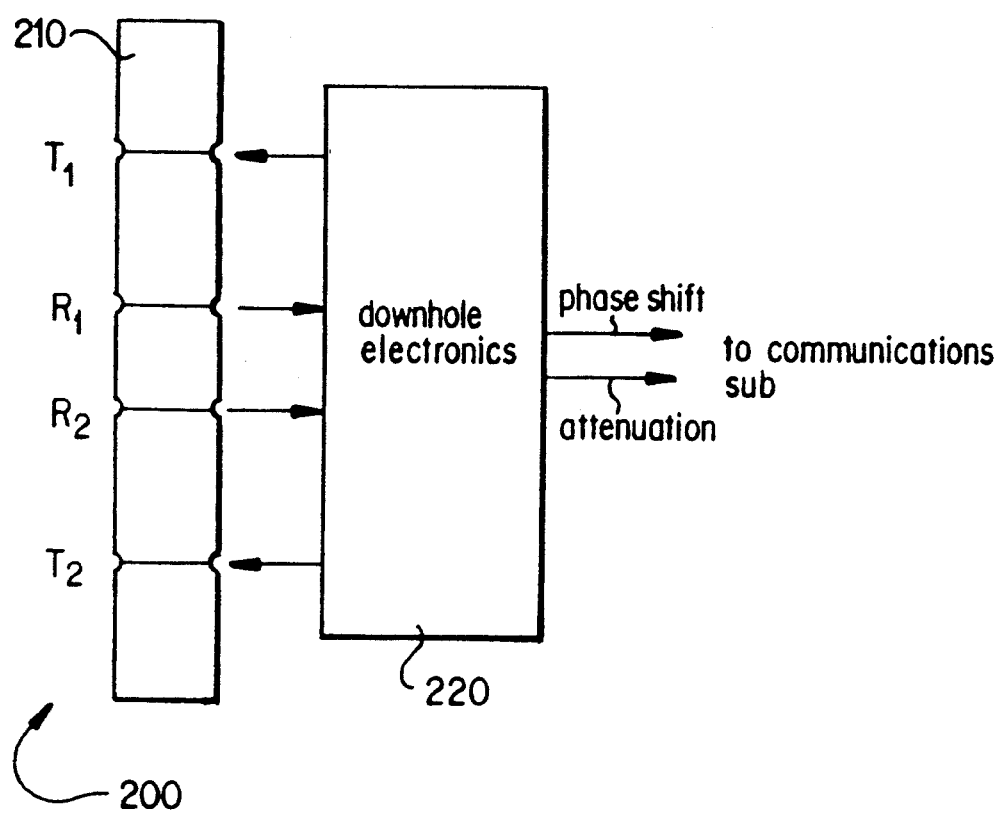
FIG. 2 is simplified diagram, partially in block form, of an apparatus for measuring formation resistivity that can be utilized in an embodiment of the invention.

FIG. 2 is a simplified representation of the formation resistivity (or conductivity) measuring subassembly 200 of the FIG. 1 apparatus. This subassembly, known in the art, may be in accordance with apparatus described in U.S. Pat. No. 4,899,112, which is incorporated herein by reference. In a preferred embodiment, the apparatus includes spaced apart transmitting antennas $T_1$ and $T_2$ mounted on a section of drill collar 210, and spaced apart receiving antennas $R_1$ and $R_2$ mounted between the transmitting antennas. The antennas are coils supported in insulating media in recesses in the drill collar. The downhole electronics, typically contained in the drill collar 210 and represented in FIG. 2 by the block 220, include, inter alia, means for alternately energizing the transmitters with a signal having a frequency in the range about 0.1 MHz to 10 MHz, and typically about 2 MHz. Electromagnetic energy is transmitted into the formation and propagates therein. Energy shed back into the borehole is measured at the receiver pair, in a so-called differential receiver arrangement, to obtain a phase shift measurement and an attenuation measurement. These measurements are coupled to the subassembly 500 for transmission to the surface of the earth where means are provided, such as in processor 85, for determining, as a function of the phase shift, the resistivity ($R_{ps}$) of formations at a relatively shallow depth of investigation around the receivers, and for determining, as a function of the attenuation, the resistivity ($R_{ad}$) of formations at a relatively deep depth of investigation around the receivers. If desired, the resistivity values can be determined downhole and transmitted uphole for recording, or stored downhole for subsequent retrieval uphole. [The downhole subsystem further includes processor electronics, including a microprocessor with associated memory, timing, and interface circuitry, as described in the referenced U.S. Pat. No. 4,899,112.] Also, the use of two transmitters provides borehole compensation, but measurements could be obtained using a single transmitter.

Figure 3:
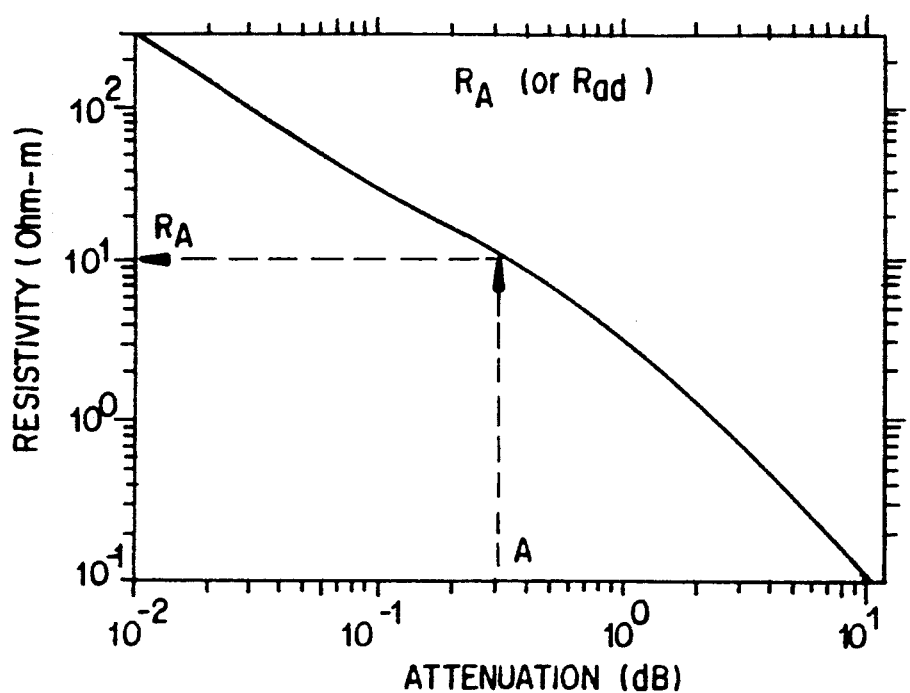
FIGS. 3 and 4 are, respectively, graphs of relationships between measured attenuation and formation resistivity, and measured phase shift and formation resistivity.
Figure 4:
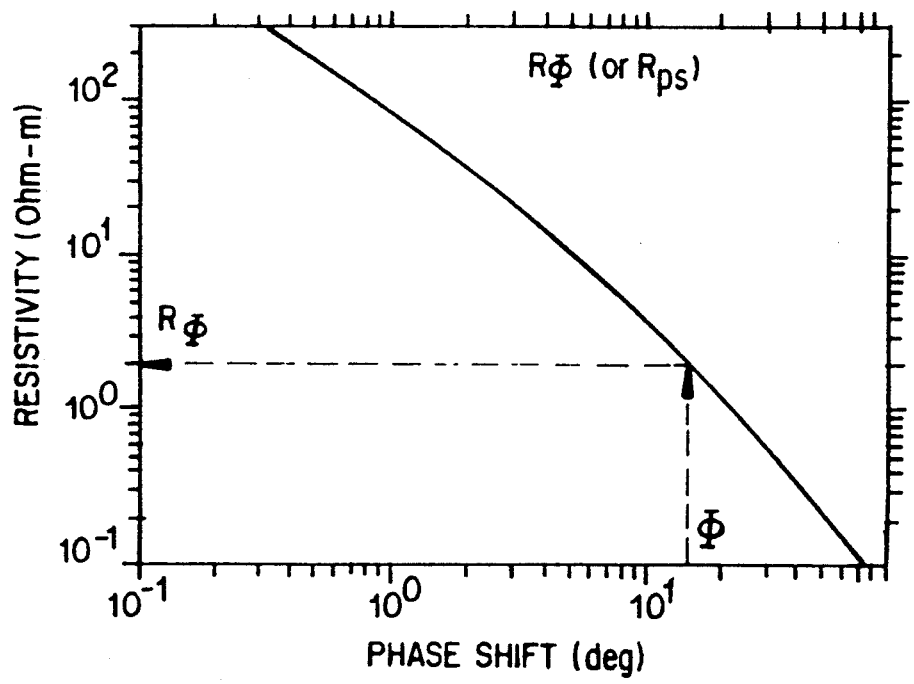

FIG. 3 represents the relationship between the measured attenuation and the attenuation-dependent resistivity, $R_{ad}$, as described in the above-referenced U.S. Pat. No. 4,899,112. FIG. 4 represents the relationship between the measured phase shift and the phase-shift-dependent resistivity, $R_{ps}$ as described in said referenced Patent. The illustrated exemplary graphs are for an embodiment with the receivers mounted on a 6.5 inch diameter drill collar, receiver spacings of 25 and 31 inches, and a transmitter frequency of 2 MHz. As described in the referenced patent, the plot of FIG. 3 can be utilized, for example, by entering the measured attenuation (minus a factor due to geometrical spreading loss) to read a corresponding value of $R_{ad}$ as determined by the curve. The plot of FIG. 4 can be utilized in similar fashion to obtain a value of $R_{ps}$ from a phase shift measurement. The referenced Patent indicates that a stored look-up table or stored polynomial curves can be used to automatically obtain values of $R_{ad}$ and/or $R_{ps}$, and that correction for permittivity can also be implemented. In the FIG. 1 arrangement, the processor 95 can be programmed in the manner described in the referenced patent to obtain these values (and/or their inverses, the conductivities $\sigma_{ad}$ and $\sigma_{ps}$), or they can be computed downhole.

Figure 5:
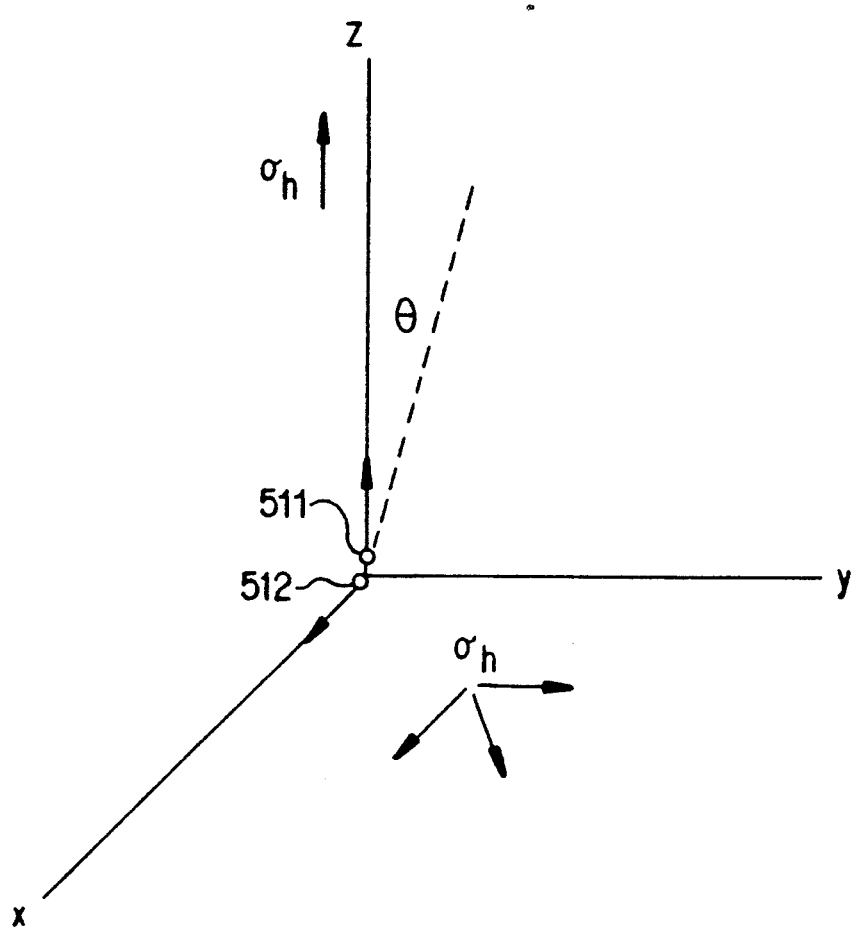
FIG. 5 shows a model space of the formations, with magnetic dipoles in the x and z directions.

Consider the model space in the diagram of FIG. 5 in which the z direction is considered vertical and the x-y plane considered horizontal. Initially, assume that bedding planes are perpendicular to the z direction and let $\sigma_v$ and $\sigma_h$ be the conductivities in the vertical (z) direction and the horizontal direction (x-z plane), respectively. As described in Moran et al., "Effects Of Formation Anisotropy On Resistivity Logging Measurements", Geophysics, Vol. 44, No. 7, 1979, the logging device coil fields can be considered as the superposition of magnetic dipoles 511 and 512 (FIG. 5) having respective magnetic moments. The magnetic dipole 511 is oriented in the vertical direction and the magnetic dipole 512 is oriented in a direction in the horizontal plane (arbitrarily, the x direction, in this case). The following notation is introduced.

$$\lambda = \sqrt{\sigma_h/\sigma_v} \tag{3}$$

$$k_h = \sqrt{i\omega\mu\sigma_h}$$

$$k_v = \sqrt{i\omega\mu\sigma_v}$$

$$r = \sqrt{x^2 + y^2 + z^2}$$

$$s = \sqrt{x^2 + y^2 + \lambda^2 z^2}$$

$$\rho = \sqrt{x^2 + y^2}$$

Then the Hertz vector and scaler potential for a magnetic dipole located at $x=y=z=0$ and oriented in the x direction is given by:

$$\pi_x = \frac{M_x}{4\pi\lambda} \frac{e^{ik_v s}}{s} \tag{4}$$

$$\pi_y = 0$$

$$\pi_z = \frac{M_x}{4\pi} \frac{x}{\rho^2} \left( \lambda z \frac{e^{ik_v s}}{s} - z \frac{e^{ik_h r}}{r} \right)$$

$$\Phi = \frac{M_x}{4\pi} \frac{ik_h x}{\rho^2} \left[ e^{ik_v s} - e^{ik_h r} + \frac{\rho^2}{r^2}\left(1 - \frac{1}{ik_h r}\right)e^{ik_h r} \right]$$

For a similar dipole oriented in the z direction:

$$\pi_x = 0 \tag{5}$$
$$\pi_y = 0$$

$$\pi_z = \frac{M_z}{4\pi} \frac{e^{ikhr}}{r}$$

$$\Phi = \frac{M_z}{4\pi} \frac{ik_h z}{r^2}\left(1 - \frac{1}{ik_h r}\right)e^{ik_h r}$$

The electric and magnetic fields are given by:

$$\vec{E} = i\omega\mu_0\sigma_h \vec{\nabla} \times \vec{\pi} \tag{6}$$
$$\vec{H} = i\omega\mu_0\sigma_h\vec{\pi} + \vec{\nabla}\Phi \tag{7}$$

From these expressions for the electric and magnetic fields, the voltages at the receivers can be derived as being equal to $i\omega^2\pi r^2_R R \vec{H}\cdot\vec{n}$ where $\vec{n}$ is the direction along the axis of the tool, $r_R$ is the radius of the receiver coil and R is the number of turns on the receiver. For an induction or a propagation logging tool $M = \pi R_T^2 T I$ where $R_T$ is the radius of the transmitter coil, T is the number of turns on the transmitter coil and I is the current.

From equations (6) and (7) one can write the magnetic field at the receiver coil for a transmitter at the origin and the tool tilted at an angle $\theta$ from z in the x-z plane. For simplicity, we can assume that the tool remains in the x-z plane. Then the components of the dipole moment of the transmitter are given by:

$$M_x = M \sin\theta \tag{8}$$

$$M_z = M \cos\theta \tag{9}$$

We will define $H_{i,j}$ as the magnetic field in the i direction due to the component of the source in the j direction. This gives:

$$H_{x,x} = \tag{10}$$

$$\frac{M_x}{4\pi}\left(\frac{e^{ik_h r}}{r^3}\left[\frac{3x^2}{r^2} - 1 + k_h^2 x^2 - \frac{ik_h r^3}{x^2} + ik_h r - \frac{3ik_h^3 x^2}{r}\right] + \frac{e^{ik_v s}}{r^3}\left[\frac{k_h^2 r^3}{\lambda s} - \frac{k_h k_v r^3}{s} - \frac{ik_h r^3}{x^2}\right]\right)$$

$$H_{x,z} = \frac{M_z}{4\pi}\frac{e^{ik_h r}}{r^3}\left[\frac{3xz}{r^2} - k_h^2 xz - \frac{3ik_h xz}{r}\right] \tag{11}$$

$$H_{z,x} = \frac{M_x}{4\pi}\frac{e^{ik_h r}}{r^3}\left[\frac{3xz}{r^2} - k_h^2 xz - \frac{3k_h i xz}{r}\right] \tag{12}$$

$$H_{z,z} = \frac{M_z}{4\pi}\frac{e^{ik_h r}}{r^3}\left[\frac{3z^2}{r^2} - 1 + k_h^2 x^2 - \frac{3ik_h z^2}{r} + ik_h r\right] \tag{13}$$

Since the transmitter and receiver are aligned in the same direction, the voltage in the receiver coil is given by:

$$V = (i\omega^2\pi R_R^2 R)(\cos\theta(H_{z,z} + H_{z,z}) + \sin\theta(H_{x,z} + H_{x,x})) \tag{14}$$

Once the voltage at each of the receiver coils due to each of the transmitter coils is determined, the total measurement can be determined by adding the voltages in the case of an induction tool, or by taking the complex ratio of the voltages in the case of a propagation tool. For example, for the propagation logging device of FIG. 2, the absolute value of the voltage at each receiver can be obtained as the square root of the sum of squares of the real and imaginary parts of the complex voltage [equation (14)], and the ratio of the absolute values provides the attenuation, from which the attenuation-determined resistivity $R_{ad}$ can be obtained (e.g. FIG. 3 above). The phase for each receiver is obtained from the arc tangent of the ratio of the imaginary and real parts of the complex voltage, and the phase shift is the difference in phase at the two receivers. The phase-shift-determined resistivity $R_{ps}$ can then be obtained (e.g. FIGS. 3 and 4 above).

In accordance with an embodiment of the invention, formation conductivity values are obtained from measurements, as described in conjunction with FIGS. 1–4. From the two measurements $\sigma_{ad}$ and $\sigma_{ps}$, an initial guess is made for the formation horizontal and vertical model conductivities and $\hat\sigma_h$ and $\hat\sigma_v$. The value(s) of the initial guess is not critical, and both can be taken to be equal to one of the measured values. Since the attenuation is generally less affected by the anisotropy, it can serve as a good starting point. Since both horizontal and vertical conductivities are equal for a starting point, the apparent values of $\hat\sigma_{ad}$ and $\hat\sigma_{ps}$ corresponding to these values of formation conductivity are simply equal to this value regardless of tool design or relative angle. If this agrees well with the observed values $\hat\sigma_{ad}$ and $\hat\sigma_{ps}$, then the formation may be judged to be isotropic and no further calculations are performed.

If the initial model values do not fit the observed values, the next step involves computing the four partial derivatives $\partial\hat\sigma_{ad}/\partial\sigma_h$, $\partial\hat\sigma_{ad}/\partial\sigma_v$, $\partial\hat\sigma_{ps}/\partial\sigma_h$, and $\partial\hat\sigma_{ps}/\partial\sigma_v$. These can be computed either analytically by taking the derivatives of the equations above, or more easily by computing the finite differences between the values of $\hat\sigma_{ad}$ and $\hat\sigma_{ps}$ at slightly different values of $\sigma_h$ and $\sigma_v$. Once the derivatives are computed, a step size and direction is chosen such that the step in $\hat\sigma_h$ and $\hat\sigma_v$ will be along the direction to minimize the errors in the calculated values of $\hat\sigma_{ad}$ and $\hat\sigma_{ps}$. The direction should be proportional to:

$$d\sigma_h \propto \frac{\partial\hat\sigma_{ps}}{\partial\sigma_v}\Delta_{ad} - \frac{\partial\hat\sigma_{ad}}{\partial\sigma_v}\Delta_{ps} \tag{15}$$

$$d\sigma_v \propto -\frac{\partial\hat\sigma_{ps}}{\partial\sigma_h}\Delta_{ad} + \frac{\partial\hat\sigma_{ad}}{\partial\sigma_h}\Delta_{ps}$$

Due to the extreme nonlinearity of the calculated values $\hat\sigma_{ad}$ and $\hat\sigma_{ps}$ upon the formation model values $\hat\sigma_h$ and $\hat\sigma_v$, it is important that the step size not be too large. It has been found that a good rule of thumb is that the maximum ratio $d\sigma/\sigma$ should be less than 0.1. In addition, the new sum of squared errors $\Delta\sigma_{ps}^2 + \Delta\sigma_{ad}^2$ is evaluated to be sure that it is not larger than the error from the previous step, where $\Delta\sigma_{ps} = \sigma_{ps} - \hat\sigma_{ps}$ and $\Delta\sigma_{ad} = \sigma_{ad} - \hat\sigma_{ad}$. If the error is larger, then the step size is cut in half and another attempt is made. If the new approximation is closer than the old one, then the process is repeated until a combination of $\hat\sigma_h$ and $\hat\sigma_v$ is found which closely reproduces the observed values of $\sigma_{ad}$ and $\sigma_{ps}$, or until a predetermined number of iterations have been performed without success.

Figure 6A:
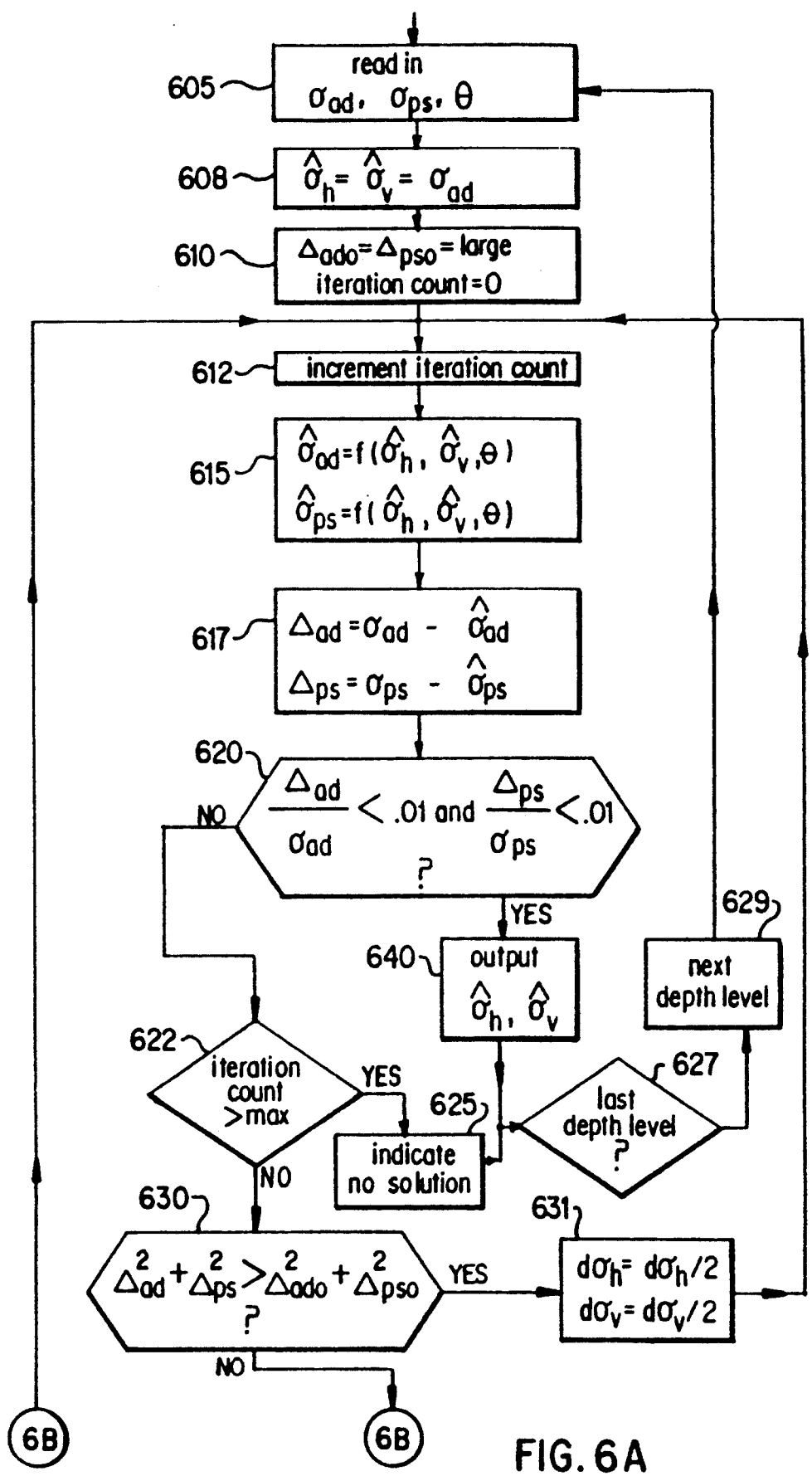
FIGS. 6A and 6B, placed one below another, illustrate a routine for programming a processor in accordance with an embodiment of the invention.
Figure 6B:
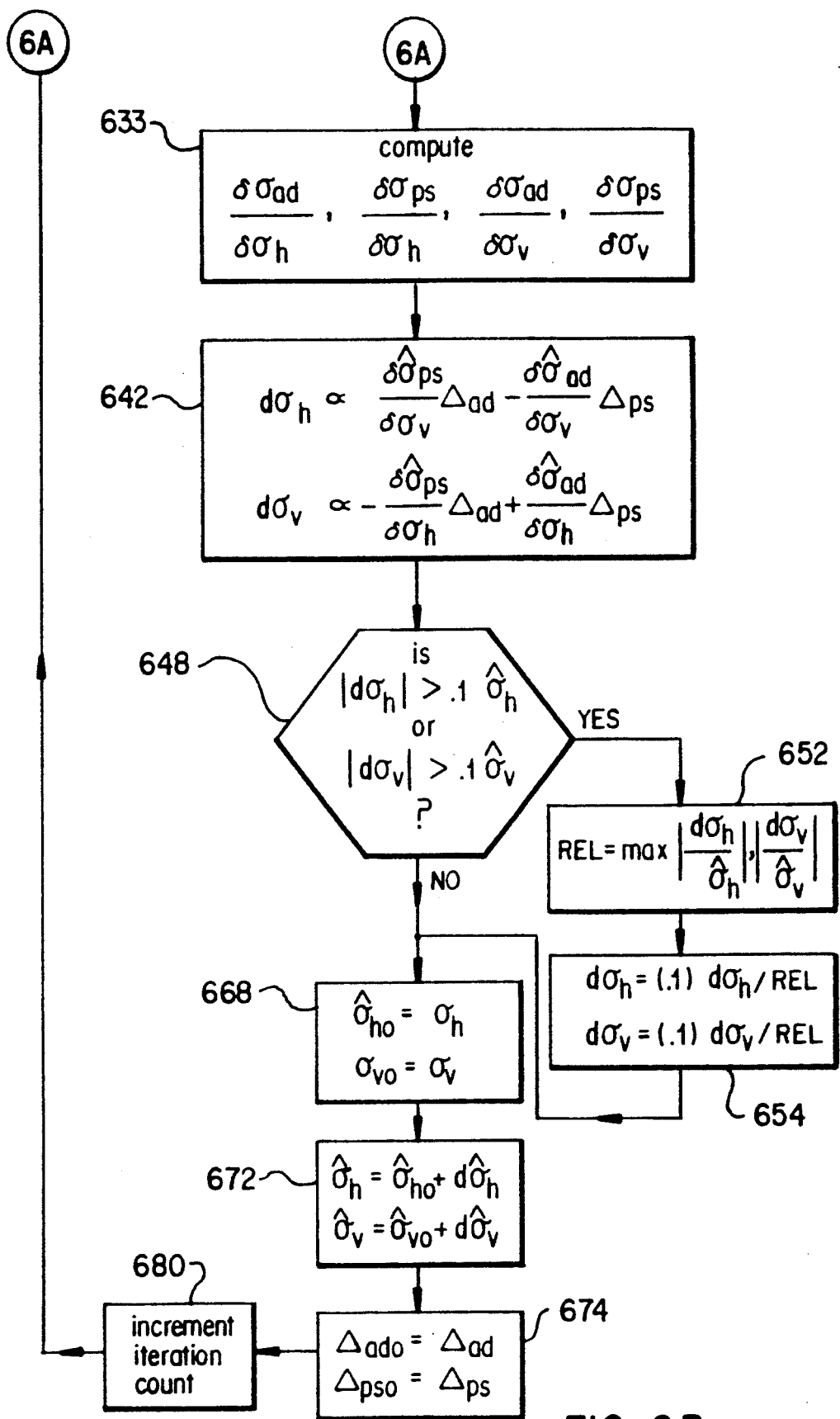

Referring to FIG. 6, there is shown a flow diagram of a routine for programming a processor (e.g. 85, FIG. 1) to implement an embodiment of the invention. [It will be understood that the processing to be described need not be performed at the wellsite, and that signals obtained at the wellsite can be processed at a remote location.] The block 605 represents the reading in of the actual values $\sigma_{ad}$ and $\sigma_{ps}$ determined from measurements at a particular depth level, and of a value for $\theta$, such as from measured inclination obtained from measurement subassembly 500 of FIG. 1, and/or from local knowledge. The block 608 represents the initalizing of the horizontal conductivity and vertical conductivity model values. In the present embodiment, the initial values for both $\hat{\sigma}_h$ and $\hat{\sigma}_v$ are selected as being the measured conductivity value $\sigma_{ad}$ for the present depth level, although it will be understood that other initial values can be utilized. The block 610 is then entered, this block representing initializing of "previous error values", $\Delta_{ado}$ and $\Delta_{pso}$, at an arbitrarily high initial value, for purposes which will become understood. Also, an iteration counter is initialized at zero. Block 612 is next entered, and represents the incrementing of the iteration count. The block 615 is then entered, this block representing the computation of the attenuation-determined conductivity and the phase-shift-determined conductivity, as a function of the model conductivity values and the dip, using equation (14) in the manner previously described. The block 617 is then entered, this block representing the computation of the error component values $\Delta_{ad}$ and $\Delta_{ps}$ as the differences between the derived conductivity values and the computed conductivity values. Inquiry is then made (diamond 620) as to whether both error values are less than 1 percent of the respective derived conductivity values. If not, inquiry is made (diamond 622) as to whether a predetermined maximum iteration count (for example, 200 iterations) has been exceeded. If so, an indication of "no solution" is provided for this depth level (block 625), and the diamond 627 is entered. If not, a determination is made (diamond 630) as to whether the sum of squares of the error values is greater than the sum of squares of the previous ("old") error values. [For the first pass this cannot be the case since the old error values were previously initialized at a high value.] If not, the block 633 is entered, this block representing the computation of the partial derivatives used in equations (15), and, subsequently, the computation of the step direction for incrementing the model conductivity values in accordance with equations (15) (block 642). Inquiry is then made (diamond 648) as to whether the determined step sizes are greater than 10 percent of the present conductivity model values. If the condition is met for either step size, the step sizes are proportionally reduced (blocks 652 and 654), so that the test of diamond 648 would now be met. So-called "old" model conductivity values are set equal to the present model conductivity values, as represented by block 668. The "old" conductivity model values are then incremented (block 672), and the "old" error values are set to the present error values (block 674). The block 612 is then re-entered for the next iteration.

Returning, now, to the "yes" branch of diamond 630, when the sum of squares of the error values is deemed to be larger than before, the step size is cut in half (block 631) and the conductivity model values are set equal to the "old" model conductivity values plus the step. The block 612 is then re-entered. If the test of diamond 630 is still not met, the step size is further reduced until the condition is satisfied.

The described routine continues until either the errors are sufficiently minimized (condition of diamond 620) or the maximum number of iterations is exceeded (condition of diamond 622). If the error size condition is met, the values of $\sigma_v$ and $\sigma_h$ are read out for the present depth level (block 640), e.g. to disc storage and recorder 45 (FIG. 1), and the decision diamond 627 is entered. If the maximum iteration count is exceeded, an indication of no solution is read out (block 625) and decision diamond 627 is entered. If the last depth level to be processed has not been reached, the depth level index is incremented (block 629) and block 605 is re-entered to begin the process for the next depth level.

Figure 7:
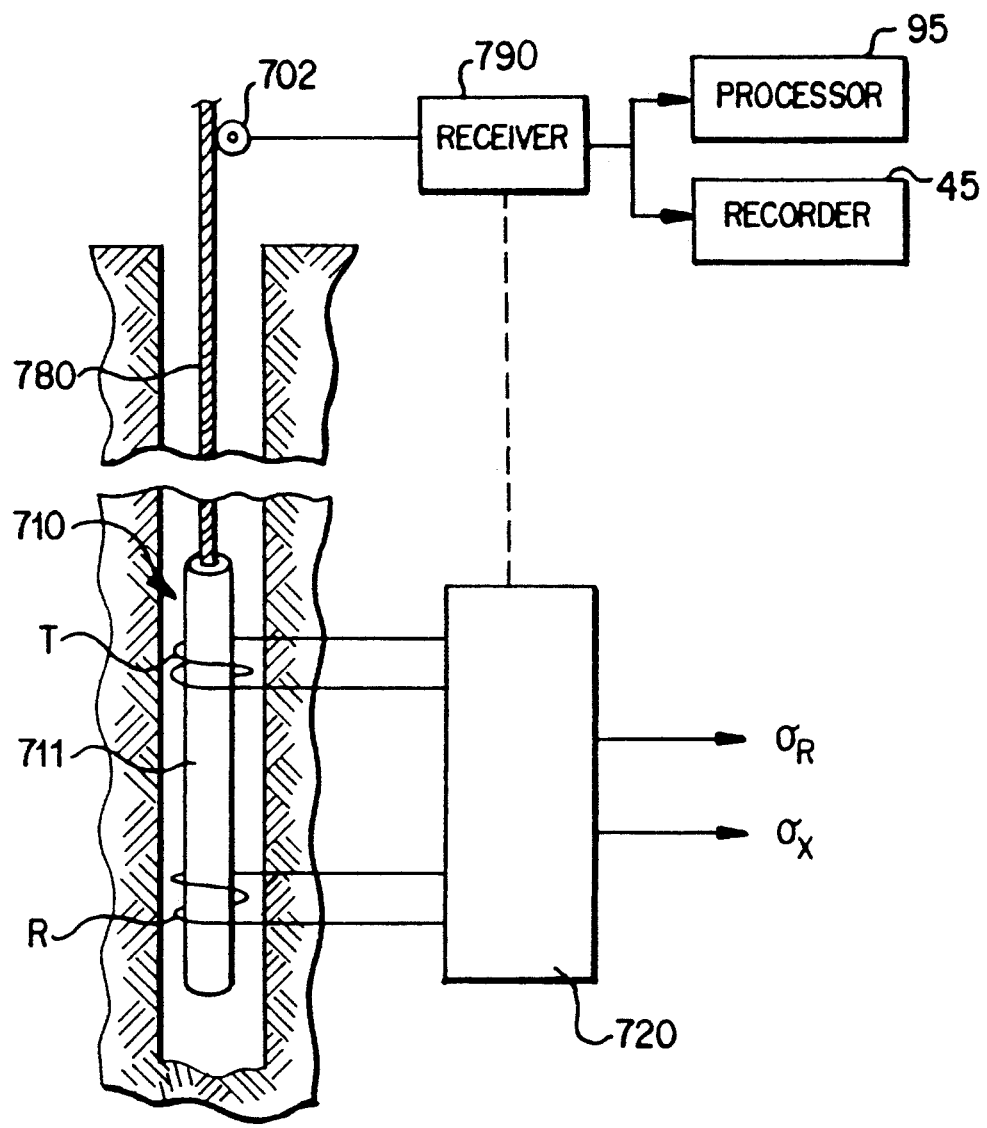
FIG. 7 is a simplified diagram, partially in block form, of an induction logging apparatus that can be utilized in an embodiment of the invention.

Referring to FIG. 7, there is shown an embodiment of the invention wherein the derived conductivity measurement values are obtained from an induction logging device 710 suspended from a wireline cable 780. The wireline cable is coupled with above-ground equipment that may include, for example, depth indicator 702, a receiver subsystem 790, and processor 95 and recorder 45 as in FIG. 1. The subsurface induction logging equipment is of a well known type, and only a simplified representation is set forth, showing a sonde 711 and transmitter and receiver coils T and R wound on insulating media on the sonde. The downhole electronics are represented by the block 720. In induction logging, one or more transmitter coils (one of which is shown) are energized by an AC signal. The resultant oscillating magnetic field causes induction of currents in the formations which are approximately proportional to the formation conductivity. These currents, in turn, cause a voltage to be induced in one or more receiver coils (one of which is shown). Typically, the transmitter coil is energized by a signal generator, and the receiver coil is coupled to a circuit that includes phase sensitive detectors which respectively receive reference phase signals that are in phase with the current in the transmitter coil and in phase quadrature with the current in the transmitter coil. Using these phase reference signals, the phase sensitive detectors respectively generate output signals which are proportional to the in-phase or "resistive component" of the induced receiver signal and the phase quadrature or "reactive" component of the induced receiver signal. These output signals are used to obtain conductivity values respectively designated $\sigma_R$ and $\sigma_x$. It is known that these conductivities are affected differently by the vertical and horizontal conductivities of the formations. [Reference can also be made to J. H. Moran et al., "Basic Theory Of Induction Logging And Application To Study Of Two Coil Sondes", *Geophysics*, Vol. 27, No. 6, 1962, and to the publications and patents cited above.] The conductivities $\sigma_R$ and $\sigma_x$ are illustrated as being outputs of circuitry 720 that are transmitted to the earth's surface via cable 780. Processing can be performed downhole or uphole. Also, it will be understood that various known techniques, for example techniques relating to improved mutual signal cancellation and focusing, can be employed.

Processing for the case of $\sigma_R$ and $\sigma_x$ conductivity values obtained from an induction logging device is similar to that set forth in the flow diagram of FIG. 6 for the embodiment utilizing conductivity values obtained from a propagation logging device. In block 605, the values read in will be $\sigma_R$, the conductivity obtained from an in-phase induction logging measurement, and $\sigma_x$, the conductivity obtained from a phase quadrature induction logging measurement. Regarding the computation of $\hat{\sigma}_R$ and $\hat{\sigma}_x$ (block 615 and subsequent), the voltage at the receiver(s) is determined from equation (14), and $\sigma_R$ is then obtained from the real part, with $\sigma_x$ being obtained from the imaginary part. When there are more than one transmitter coil and more than one receiver coil, the receiver voltages attributable to each transmitter-receiver pair are added. The real part of the sum of voltages provides $\sigma_R$, and the imaginary part of the sum of voltages provides $\sigma_x$. It will be understood that appropriate computational adjustments, to match the manner in which the measurements are taken and/or processed, can readily be made.

It will be recognized that alternatives exist to the iterative approach described in conjunction with the flow diagram of FIG. 6. For example, with derived values for the dip angle and for two conductivities from measurements that are affected differently by the vertical and horizontal conductivities of the formations (e.g. $\sigma_{ad}$ and $\sigma_{ps}$, or $\sigma_R$ and $\sigma_x$), one can utilize the relationships set forth to obtain $\sigma_h$ and $\sigma_v$ in different manner. This may be done, for example, by generating and using look-up tables that are based on the relationships set forth or by using graphs representing the look-up tables. Polynomial functions, or other functional forms, whose coefficients are chosen in accordance with the relationships set forth, can also be utilized.

Figure 8:
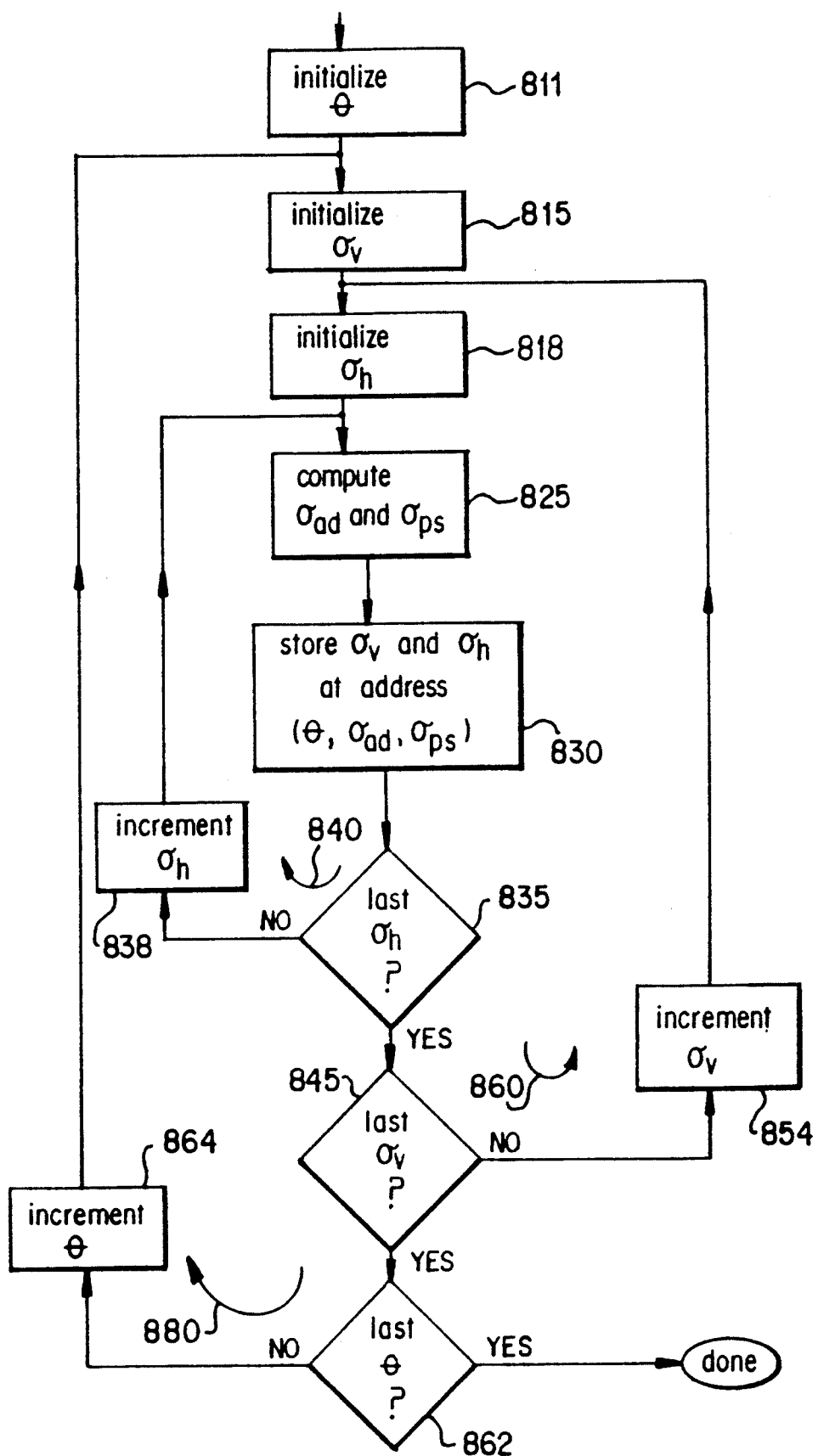
FIG. 8 is a flow diagram of a routine for programming a processor to generate and store a look-up table useful in an embodiment of the invention.

Referring to FIG. 8, there is shown a flow diagram of a routine with which a processor can be programmed (typically, before operation) to obtain and store the look-up table for obtaining horizontal and vertical conductivity values from input information that includes dip angle and two measured conductivity values (e.g. $\sigma_{ad}$ and $\sigma_{ps}$, in this example). A value of dip angle is initialized at one end of the range the table is to cover, as represented by the block 811. Values of vertical conductivity and horizontal conductivity are also initialized at one end of the range that the table is to cover, as represented by the blocks 815 and 816 respectively. Values of $\sigma_{ad}$ and $\sigma_{ps}$ are then computed, using equation (14) in the manner previously described, as represented by the block 825. The present values of $\theta$, $\sigma_h$ and $\sigma_v$ are then stored at a memory location determined by the computed values $\sigma_{ad}$ and $\sigma_{ps}$, and by $\theta$, as represented by the block 830. Inquiry is then made (diamond 835) as to whether the last $\sigma_h$ for the table has been reached. If not, $\sigma_h$ is incremented (block 838), the block 825 is re-entered, and the loop 840 continues until all $\sigma_h$ have been considered. When this occurs, inquiry is made (diamond 845) as to whether the last $\sigma_v$ in the range of interest has been considered. If not, $\sigma_v$ is incremented (block 854) $a_h$ is re-initialized (block 818), and the nested loops 860 and 840 continue until all pairs of values of $\sigma_h$ and $\sigma_v$ are considered for the present $\theta$. When the inquiry of diamond 845 is answered in the affirmative, table values will have been stored with regard to all pairs ($\sigma_h$, $\sigma_v$) for the present value of dip angle, $\theta$. Inquiry is then made (diamond 862) as to whether the last $\theta$ to be considered has been reached. If not, block 815 is re-entered, $\sigma_v$ and $\sigma_h$ are again initialized, and the nested loops 840, 860, and 880 are repeated as table values are stored for each conductivity pair at each $\theta$.

Figure 9:
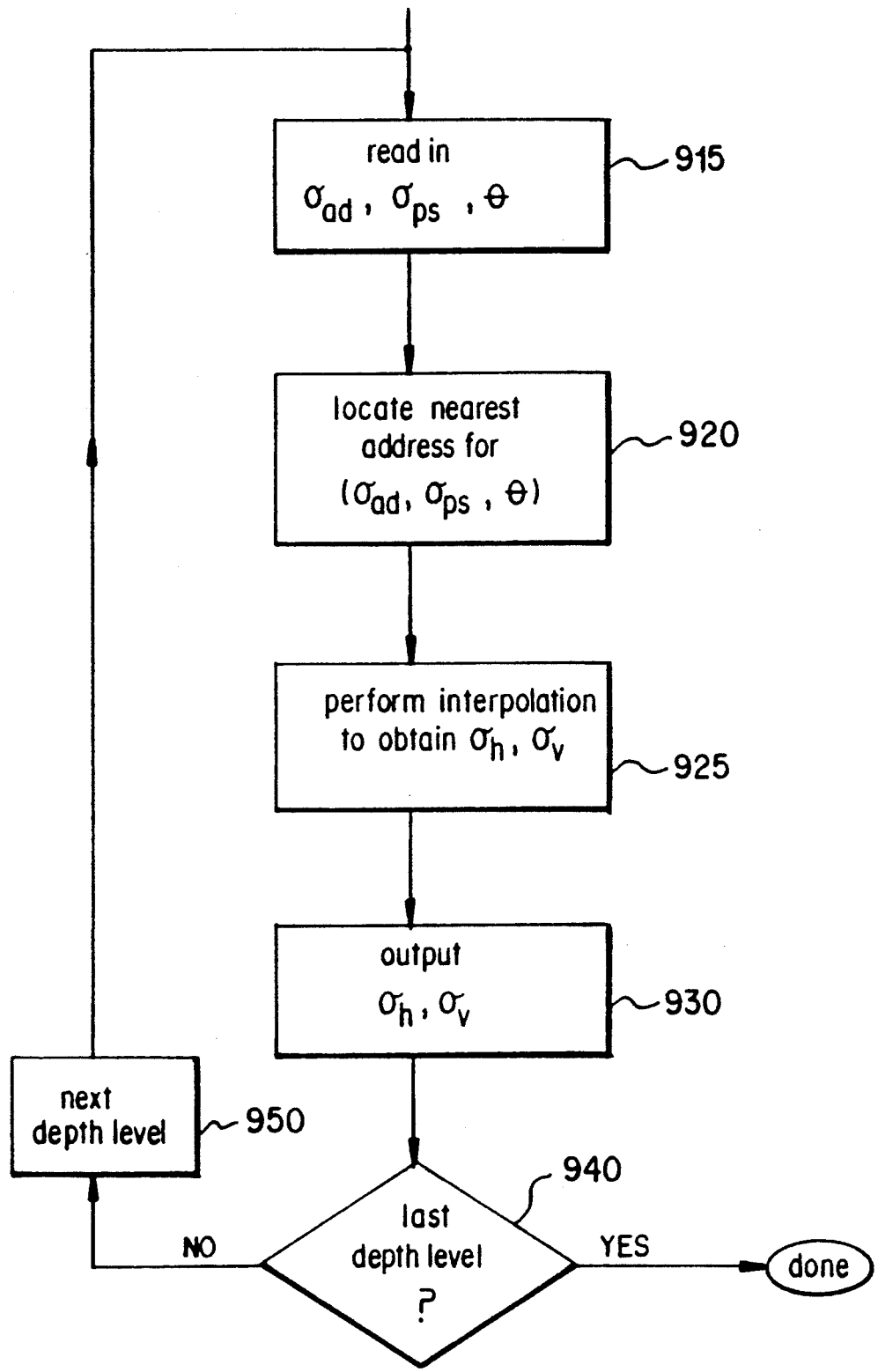
FIG. 9 is a flow diagram of a routine for programming a processor to use the look-up table in accordance with an embodiment of the invention.

Referring to FIG. 9, there is shown a flow diagram of a routine for controlling a processor, for example processor 95, loaded with the previously computed look-up table information, to determine horizontal conductivity and vertical conductivity for particular derived values of $\sigma_{ad}$, $\sigma_{ps}$, and $\theta$. The block 915 represents the reading in of the derived values of $\sigma_{ad}$, $\sigma_{ps}$, and $\theta$ for a particular depth level. The closest address location in the data base is then determined (block 920). An interpolation is then performed (block 925) from said closest point (address), with respect to adjacent points in the three dimensions of the address space (block 925) to locate values of $\sigma_h$ and $\sigma_v$. The with respect to adjacent points in the three dimensions of the values are read out (block 930), and inquiry is made (diamond 940) as to whether the last depth level to be processed has been reached. If not, the next depth level is considered (block 950), and the block 915 is re-entered for processing the next depth level. The procedure continues until the inquiry of diamond 940 is answered in the affirmative.

The invention has been described with reference to particular preferred embodiments, but variations within the spirit and scope of the invention will occur to those skilled in the art. For example, it will be understood that the derived measurements, which respectively have different dependence on the formation horizontal and vertical conductivities, can be from other types of logging devices, such as devices employing electrodes. Also, it will be understood that the measurements can be from different devices, for example one measurement from a propagation logging device and another measurement from a logging device that utilizes electrodes. Further, the respective measurements can be taken at different frequencies, different spacings, or with other parameter variations. It should also be noted that while two conductivity measurements are utilized in the illustrated embodiment, more than two such measurements can be utilized at a particular depth level, if desired. Also, the principles of the present invention are applicable where anisotropy exists in three dimensions, for example with different conductivities in the x,y directions in the horizontal plane. Finally, it will be understood that reference to horizontal and vertical components is for convenience, and is intended to generically include processing to obtain orthogonal conductivity components.

What is claimed is:

1. A method for generating a log of the horizontal conductivity and the vertical conductivity of earth formations surrounding a borehole, comprising the steps of:
   a) moving through the borehole a logging apparatus having a transmitter coil and at least one receiver coil, all of the coils being axially aligned, and deriving first and second formation conductivity values from measurements taken in the borehole by transmitting electromagnetic energy from said transmitter coil and receiving electromagnetic energy at said at least one receiver coil;
   b) selecting a horizontal conductivity model value and a vertical conductivity model value;
   c) computing error values from the differences between: (i) first and second composite conductivity values computed as a function of said horizontal and vertical conductivity model values, and (ii) said first and second derived formation conductivity values;
   d) modifying said horizontal and vertical conductivity model values;
   e) repeating steps (c) and (d) until predetermined criteria of said error values are met; and
   f) recording modified horizontal and vertical conductivity model values as recorded values; and
   g) repeating steps (a) through (f) for a number of depth levels in the borehole to obtain a log of recorded horizontal and vertical conductivity values.

2. The method as defined by claim 1, wherein said derived first and second formation conductivity values are from respectively different measurements taken with the coils of said logging apparatus at a given depth level in the borehole.

3. The method as defined by claim 1, wherein said derived first and second formation conductivity values are obtained from measurements which are affected differently by the vertical and horizontal conductivities of the formations.

4. The method as defined by claim 1 wherein said derived first and second formation conductivity values are respectively obtained from attenuation and phase measurements.

5. The method as defined by claim 1, wherein said horizontal and vertical conductivity model values are modified as a function of said error values.

6. The method as defined by claim 1, further comprising deriving a formation dip angle, and wherein said first and second composite conductivity values are computed as a function of said horizontal and vertical conductivity model values and said dip angle.

7. The method as defined by claim 3, further comprising deriving a formation dip angle, and wherein said first and second composite conductivity values are computed as a function of said horizontal and vertical conductivity model values and said dip angle.

8. The method as defined by claim 5, further comprising deriving a formation dip angle, and wherein said first and second composite conductivity values are computed as a function of said horizontal and vertical conductivity model values and said dip angle.

9. The method as defined by claim 2, wherein at least said steps (c) through (e) are performed by a machine processor.

10. The method as defined by claim 7, wherein at least said steps (c) through (e) are performed by a machine processor.

11. The method as defined by claim 5, wherein said error values comprise a first error value that depends on the difference between said first composite conductivity value and said first derived formation conductivity value, and said second error value depends on the difference between said second composite conductivity value and said second derived formation conductivity value.

12. The method as defined by claim 11, wherein said predetermined criteria of said error values requires both said first and second error values to be less than prescribed maxima.

13. The method as defined by claim 7, wherein said first composite conductivity is a computed attenuation-dependent conductivity, and said second composite conductivity is a computed phase-dependent conductivity.

14. The method as defined by claim 5, further comprising determining the gradient of said computed error values, and incrementing said horizontal and vertical conductivity model values in a step direction determined from said gradient.

15. The method as defined by claim 14, further comprising adjusting the step size of said model value increments to be less than a predetermined fraction of the model conductivity values.

16. The method as defined by claim 6, wherein steps (c) through (e) are repeated until said error values are less than prescribed maxima or until said steps have been repeated a predetermined number of times.

17. The method as defined by claim 1 wherein said measurements taken n the borehole are propagation logging measurements.

18. The method as defined by claim 1 wherein said measurements taken in the borehole are induction logging measurements.

19. A method for generating a log of the horizontal conductivity and the vertical conductivity of formations surrounding an earth borehole, comprising the steps of:

a) moving a logging apparatus through the borehole and deriving values representative of attenuation and phase shift of electromagnetic energy that propagated through a formation from said logging apparatus;

b) deriving a dip angle of the borehole with respect to the formation;

c) selecting a horizontal conductivity model value and a vertical conductivity model value;

d) computing an attenuation-dependent conductivity value and a phase-shift-dependent conductivity value as functions of said horizontal and vertical conductivity model values and said dip angle;

e) computing an error as a function of the derived attenuation and phase values and the computed conductivity values;

f) modifying said horizontal and vertical conductivity model values;

g) repeating steps (d) through (f) until a predetermined criterion of said error is met;

h) recording modified horizontal and vertical conductivity model values as recorded values; and i) repeating steps (a) through (h) for a number of depth levels in the borehole to obtain a log of recorded horizontal and vertical conductivity values.

20. The method as defined by claim 19, wherein said attenuation and phase shift values are derived from measurements taken with said logging apparatus at a given depth level in the borehole.

21. The method as defined by claim 20, wherein said horizontal and vertical conductivity model values are modified as a function of said error.

22. The method as defined by claim 21, wherein said predetermined criterion of said error requires said error to be less than a prescribed maximum.

23. The method as defined by claim 20, wherein said derived values representative of attenuation and phase are respectively a derived attenuation-dependent conductivity value and a phase-shift-dependent conductivity value, and wherein said error comprises a first error value that depends on the difference between said derived attenuation-dependent conductivity value and said computed attenuation-dependent conductivity value and a second error value that depends on the difference between said derived phase-shift-dependent conductivity value and said computed phase-shift-dependent conductivity value.

24. The method as defined by claim 23, wherein said predetermined criterion of said error requires both said error values to be less than prescribed maxima.

25. The method as defined by claim 23, further comprising determining the gradient of said error, values and incrementing said horizontal and vertical conductivity model values in a step direction determined from said gradient.

26. The method as defined by claim 25, further comprising adjusting the step size of said model value increments to be less than a predetermined fraction of the model conductivity values.

27. The method as defined by claim 20, wherein at least said steps (c) through (g) are performed by a machine processor.

28. Apparatus for generating a log of the horizontal conductivity and the vertical conductivity of earth formations surrounding a borehole, comprising:
an elongated logging apparatus having a transmitter coil and at least one receiver coil, the axis of each of said coils being coincident with the axis of said logging apparatus, said logging apparatus including means for deriving first and second formation conductivity values from measurements taken with said coils in the borehole;
means for selecting a horizontal conductivity model value and a vertical conductivity model value;
means for computing error values from the differences between: (i) first and second composite conductivity values computed as a function of said horizontal and vertical conductivity model values, and (ii) said first and second derived formation conductivity values;
means for modifying said horizontal and vertical conductivity model values;
means for repeating implementation by said computing means and said modifying means until predetermined criteria of said error values are met; ad
means for recording modified horizontal and vertical conductivity model values, as recorded values, at a number of depth levels in the borehole to obtain a log of recorded horizontal and vertical conductivity values.

29. Apparatus as defined by claim 28, wherein said derived first and second formation conductivity values are from respectively different measurements taken with said coils at a given depth level in the borehole.

30. Apparatus as defined by claim 29, wherein said derived first and second formation conductivity values are obtained from measurements which are affected differently by the vertical and horizontal conductivities of the formations.

31. Apparatus as defined by claim 28, further comprising deriving a formation dip angle, and wherein said first an second composite conductivities are computed as a function of said horizontal and vertical conductivity model values and said dip angle.

32. A method for generating a log of the horizontal conductivity and the vertical conductivity of earth formations surrounding a borehole, comprising the steps of:
a) moving an induction logging apparatus through the borehole, and deriving a first conductivity value from an in-phase induction logging measurement in the borehole and a second conductivity value from a phase quadrature induction logging measurement in the borehole;
b) deriving a dip angle of the borehole with respect to the formation;
c) selecting a horizontal conductivity model value and a vertical conductivity model value;
d) computing an in-phase conductivity value and a phase quadrature conductivity value as functions of said horizontal and vertical conductivity model values and said dip angle;
e) computing an error as a function of the derived first and second conductivity values and the computed conductivity values;
f) modifying said horizontal and vertical conductivity model values;
g) repeating steps (d) through (f until a predetermined criterion of said error is met; ad
h) recording modified horizontal and vertical conductivity model values as recorded values; and
i) repeating steps (a) through (h) for a number of depth levels in he borehole to obtain a log of recorded horizontal and vertical conductivity values.

33. The method as defined by claim 32, wherein said derived conductivity values are from measurements taken with axially aligned coils of said induction logging apparatus at a given depth level in the borehole.

34. The method as defined by claim 33, wherein said horizontal and vertical conductivity model values are modified as a function of said error.

35. The method as defined by claim 34, wherein said predetermined criterion of said error requires said error to be less than a prescribed maximum.

36. The method as defined by claim 32, wherein said error comprises a first error value that depends on the difference between said derived first conductivity value and said computed in-phase conductivity value and a second error value that depends on the difference between said derived second conductivity value and said computed phase quadrature conductivity value.

37. The method as defined by claim 33, wherein said error comprises a first error value that depends on the difference between said derived first conductivity value and said computed in-phase conductivity value and a second error value that depends on the difference between said derived second conductivity value and said computed phase quadrature conductivity value.

38. The method as defined by claim 36, wherein said predetermined criterion of said error requires both said error values to be less than prescribed maxima.

39. The method as defined by claim 32, further comprising determining the gradient of said error values and incrementing said horizontal and vertical conductivity model values in a step direction determined rom said gradient.

40. The method as defined by claim 39, further comprising adjusting the step size of said model value increments to be less than a predetermined fraction of the model conductivity values.

41. A method for generating a log of the horizontal conductivity and the vertical conductivity of earth formations surrounding a borehole, comprising the steps of:
a) moving a logging apparatus having axially aligned coils through the borehole, and deriving first and second formation conductivity values from measurements taken in the borehole with the coils of said logging apparatus, said derived first and second conductivity values being obtained from measurements which are affected differently by the vertical and horizontal conductivities of the formations;
b) deriving an angle related to the dip of said formations;
c) computing horizontal and vertical conductivity values from said derived first and second conductivity values and said derived angle;
d) recording said horizontal and vertical conductivity values, and
e) repeating steps (a) through (d) for a number of depth levels in the borehole to obtain a log of recorded horizontal and vertical conductivity values.

42. A method for determining the horizontal conductivity and the vertical conductivity of earth formations surrounding a borehole, comprising the steps of:

a) deriving first and second formation conductivity values from measurements taken in the borehole, said derived first and second conductivity values being obtained from measurements which are affected differently by the vertical and horizontal conductivities of the formations;

b) deriving an angle related to the dip of said formations;

c) computing horizontal and vertical conductivity values from said derived first and second conductivity values and said derived angle; and d) outputting said horizontal and vertical conductivity values.

43. The method as defined by claim 42, wherein said step of computing horizontal and vertical conductivity values includes storing a look-up table of values, and selecting values from said look-up table based on said derived first and second conductivity values and said derived angle.

44. The method as defined by claim 42, wherein said derived first and second conductivity values are respectively an attenuation-dependent conductivity value and a phase-shift-dependent conductivity value obtained from a propagation logging device.

45. The method as defined by claim 43, wherein said derived first and second conductivity values are respectively an attenuation-dependent conductivity value and a phase-shift-dependent conductivity value obtained from a propagation logging device.

46. The method as defined by claim 42, wherein said derived first and second conductivity values are respectively an in-phase conductivity value and a phase-quadrature conductivity value obtained from an induction logging device.

47. The method as defined by claim 43, wherein said derived first and second conductivity values are respectively an in-phase conductivity value and a phase-quadrature conductivity value obtained from an induction logging device.

48. The method as defined by claim 42, wherein at least step (c) is performed with a machine processor.

49. The method as defined by claim 42, wherein at least step (c) is performed with a machine processor.

* * * * *